(12) United States Patent
Burianek et al.

(10) Patent No.: US 7,082,457 B1
(45) Date of Patent: Jul. 25, 2006

(54) SYSTEM AND METHOD FOR DELEGATION IN A PROJECT MANAGEMENT CONTEXT

(75) Inventors: Francis Robert Burianek, Kirkland, WA (US); Tanasak Huangyutitham, Redmond, WA (US); Ying Wang, Bellevue, WA (US); Izi Behar, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 838 days.

(21) Appl. No.: 09/704,068

(22) Filed: Nov. 1, 2000

(51) Int. Cl.
*G06F 15/16* (2006.01)
*G06F 7/00* (2006.01)
*G06F 15/173* (2006.01)

(52) U.S. Cl. .................. 709/204; 709/202; 709/224; 707/2; 707/100

(58) Field of Classification Search ........ 709/203–205; 707/9, 102; 718/1, 100; 717/100, 101
See application file for complete search history.

(56) References Cited

U.S. PATENT DOCUMENTS

| | | | |
|---|---|---|---|
| 5,649,099 A * | 7/1997 | Theimer et al. ............ 713/201 |
| 6,006,215 A * | 12/1999 | Retallick .................... 707/2 |
| 6,189,103 B1 * | 2/2001 | Nevarez et al. ............ 713/201 |
| 6,421,678 B1 * | 7/2002 | Smiga et al. ............... 707/102 |
| 6,510,451 B1 * | 1/2003 | Wu et al. .................... 709/203 |
| 6,691,151 B1 * | 2/2004 | Cheyer et al. ............. 709/202 |
| 2002/0019825 A1 * | 2/2002 | Smiga et al. ............... 707/102 |
| 2002/0040304 A1 * | 4/2002 | Shenoy et al. ............. 705/1 |
| 2005/0102287 A1 * | 5/2005 | Poole ........................... 707/9 |

* cited by examiner

*Primary Examiner*—Wen-Tai Lin
(74) *Attorney, Agent, or Firm*—Perkins Coie LLP

(57) ABSTRACT

A system implemented on a computer network for delegating tasks within a project to achieve collaboration among resources in a team environment. Components of the computer network permit communication among a project manager and resources working on the project. Task delegations can be performed vertically from the project manager to resources and horizontally among resources. The project manager can monitor the delegations or can allow the resources to control the delegations. Resources can also further define and subdivide tasks. Ownership of tasks and other information about the status of the tasks can be stored and assembled in various useful formats for the project manager.

19 Claims, 12 Drawing Sheets

Database Structures

Assignment Table 810

| Task ID (815) | Name (820) | Resource ID (825) | Resource ID – Team Lead (830) |
|---|---|---|---|
|  |  |  |  |

*FIG. 8A*

Delegation Table 835

| Delegation ID (840) | R1 ID (845) | R2 ID (850) | Date (855) | Reject (860) |
|---|---|---|---|---|
|  |  |  |  |  |

*FIG. 8B*

Delegation – Assignment Table 865

| Delegation ID (840) | Assignment ID (815) | Approve (PM client) (870) | Accept (R2) (875) | Track (Retain copy) (880) |
|---|---|---|---|---|
|  |  |  |  |  |

*FIG. 8C*

Message Table 885

| Message ID (890) | Delegation ID (840) |
|---|---|
|  |  |

*FIG. 8D*

SYSTEM AND METHOD FOR DELEGATION IN A PROJECT MANAGEMENT CONTEXT

TECHNICAL FIELD

The present invention is generally directed to project collaboration in a team environment. More specifically, the present invention provides a project management software module which can enable collaboration among workers by the sharing and delegation of tasks.

BACKGROUND OF THE INVENTION

Large projects generally involve a manager, who oversees the project, and many workers, also referred to as resources, who perform smaller tasks within the project. In such a context, a project manager will often need to delegate tasks to various resources. In a large project, resources may also want the ability to further define, divide, and/or delegate tasks to other resources, creating a hierarchy of delegation. The project manager may want to control approval of the further delegation of a task. Hierarchical delegation may also lead to the creation of intermediate managers, called team leaders. Thus, it is desirable, particularly in large projects, to be able to monitor which resource is working on a particular task and the current status of that task.

Existing project management software modules do not enable managers to monitor complex levels of task delegation and do not support the easy flow of tasks among resources as a project progresses. The conventional approach is one of simple delegation where a project manager performs the delegating and passes tasks to a resource. However, requiring the project manager to be involved in every assignment of a task is inefficient and cumbersome. Moreover, the inability to transfer responsibility for, or ownership of, a task further hinders collaboration and productivity.

In view of the foregoing, there is a need in the art for a system which will support the delegation of tasks and facilitate collaboration among resources in the context of a project. Specifically, a need exists in the art for a system which will allow a project manager to choose the level of control and scrutiny she will have over the delegation of tasks. A further need exists which will enable resources to further define, subdivide, and delegate tasks. There is also a need to maintain a record of, among other things, the tasks, the delegations, and which resources are working on the tasks.

SUMMARY OF THE INVENTION

The present invention is generally directed to a feature in a project management software module which can enable collaboration among workers. This collaboration occurs through the sharing of smaller tasks among the resources involved in a larger project. Responsibility for tasks can be delegated from a project manager to resources working on a project by assigning task ownership. The ability to have tasks transferred from a resource to any other resource distinguishes the invention from traditional project management. As a project progresses, tasks can be easily transferred from one manager to another. The feature can accommodate varying levels of manager control over the delegation process from a strictly monitored approach to a flexible, highly collaborative one.

As noted above, existing project management software does not enable collaboration and the sharing of tasks among resources. The conventional approach is one of simple delegation where a project manager passes tasks to a resource. In contrast, the present invention allows resources to delegate tasks to other resources, but the project manager can maintain full ownership of the tasks, meaning she can approve or reject any delegation. The invention also can allow for more complex vertical delegation which creates middle roles such as team leads and resource managers. Vertical delegation also permits tasks to be further defined or expanded as they are delegated and as the project progresses. By integrating the delegation feature in a distributed computer network, such as the Internet, a user can control the flow of tasks on her end of the application.

The present invention operates in a distributed computing environment. The invention enables delegation of a task whereby a first resource, the delegator, sends a signal concerning the delegation to a computer server. A second resource, the delegatee, and a project manager can access the server and retrieve delegation information. The server also sends the delegation information to the project manager and to a storage device which records information about each task that is delegated. The delegatee may choose to reject the delegation, whereby a rejection signal would be sent to the computer server and a record of the delegation rejection would be stored in the storage device. When the delegator and the project manager access the computer server, they can receive the delegation rejection information. The project manager may also reject the delegation by sending a rejection message to the server and having the information stored in the storage device. The delegator and delegatee can access the computer server to receive the rejection information. The project manager may obtain updated information about each of the project tasks by sending a request to the server which retrieves the information from the database.

The system also permits a delegatee to subdivide a task and further delegate it to a third resource. In this context the second resource becomes the delegator and the third resource becomes the delegatee. This delegation is accomplished in the same manner as previously described whereby the delegator sends a signal to the computer server and information about the delegation is stored in the storage device. The delegatee can then receive the delegation information from the server.

The present invention can also employ a unique database structure for assembling information about all delegations which take place. Every task can be given an identification number and each time a task is delegated, that delegation can be given an identification number. The task and delegation numbers can be organized in table format for tracking the status and history of tasks.

BRIEF DESCRIPTION OF THE DRAWINGS

FIGS. 8A, 8B, 8C, and 8D, collectively described as FIG. 8, are diagrams of database structures for an exemplary embodiment of the present invention.

DETAILED DESCRIPTION OF THE EXEMPLARY EMBODIMENTS

Figure 1:
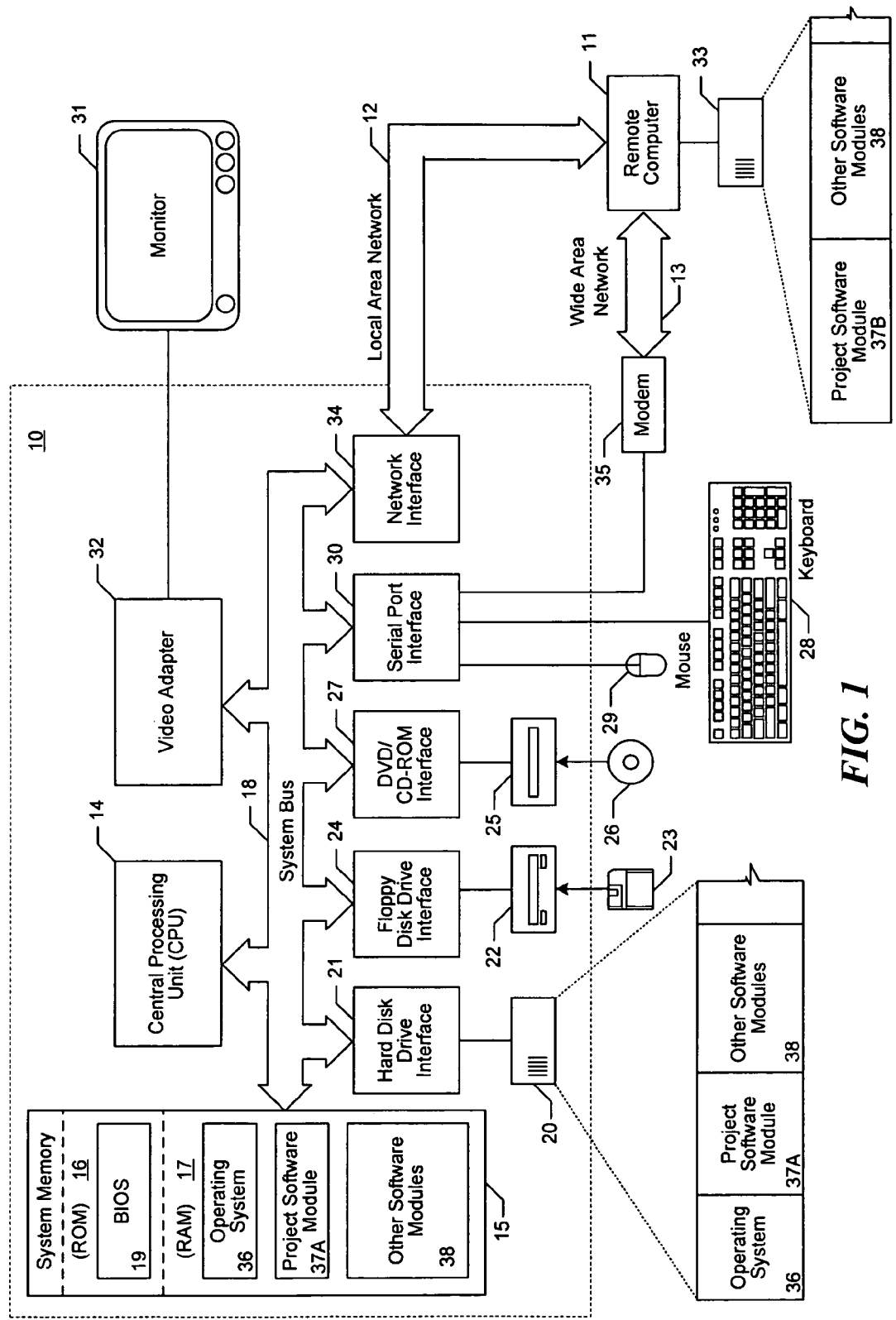
FIG. 1 is a block diagram illustrating the operating environment for an exemplary embodiment of the present invention.

The present invention allows for the transfer of smaller tasks within a larger project from a project manager client to resource clients and from one resource client to another resource client. In the latter situation, the first resource client may delegate a task to a second resource client and assume the role of an intermediate manager, also called a team leader. In another variation a team leader may subdivide a task and delegate some or all of the subdivisions. The delegating client, be it a project manager client or a resource client, has the option of retaining a copy of the delegated task and monitoring its progress. Furthermore, the project manager client may allow automatic approval of all delegations. All data concerning the delegation and status of tasks is stored in a database. This information may be requested by the project manager client. These delegation options enable greater collaboration among the project manager client and the resource clients. This flexibility is also useful because projects change as they progress.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet.

The detailed description which follows is represented largely in terms of processes and symbolic representations of operations in a distributed computing environment by conventional computer components, including remote file servers, remote computer servers, remote memory storage devices, a central processing unit (CPU), memory storage devices for the CPU, display devices and input devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred computer hardware and program modules, and that additional information is readily available in the appropriate programming manuals, user's guides, and similar publications.

FIG. 1 illustrates a conventional personal computer 10 suitable for supporting the operation of the preferred embodiment of the present invention. As shown in FIG. 1, the personal computer 10 operates in a networked environment with logical connections to a remote computer 11. The logical connections between the personal computer 10 and the remote computer 11 are represented by a local area network 12 and a wide area network 13. Those of ordinary skill in the art will recognize that in this client/server configuration, the remote computer 11 may function as a file server or computer server.

The personal computer 10 includes a central processing unit (CPU) 14, such as "PENTIUM" microprocessors manufactured by Intel Corporation of Santa Clara, Calif. The personal computer also includes system memory 15, including read only memory (ROM) 16 and random access memory (RAM) 17, which is connected to the CPU 14 by a system bus 18. The preferred computer 10 utilizes a BIOS 19, which is stored in ROM 16. Those skilled in the art will recognize that the BIOS 19 is a set of basic routines that helps to transfer information between elements within the personal computer 10. Those skilled in the art will also appreciate that the present invention may be implemented on computers having other architectures, such as computers that do not use a BIOS, and those that utilize other microprocessors.

Within the personal computer 10, a local hard disk drive 20 is connected to the system bus 18 via a hard disk drive interface 21. A floppy disk drive 22, which is used to read or write a floppy disk 23, is connected to the system bus 18 via a floppy disk drive interface 24. A CD-ROM or DVD drive 25, which is used to read a CD-ROM or DVD disk 26, is connected to the system bus 18 via a CD-ROM or DVD interface 27. A user enters commands and information into the personal computer 10 by using input devices, such as a keyboard 28 and/or pointing device, such as a mouse 29, which are connected to the system bus 18 via a serial port interface 30. Other types of pointing devices (not shown in FIG. 1) include track pads, track balls, pens, head trackers, data gloves and other devices suitable for positioning a cursor on a computer monitor 31. The monitor 31 or other kind of display device is connected to the system bus 18 via a video adapter 32.

The remote computer 11 in this networked environment is connected to a remote memory storage device 33. This remote memory storage device 33 is typically a large capacity device such as a hard disk drive, CD-ROM or DVD drive, magneto-optical drive or the like. The personal computer 10 is connected to the remote computer 11 by a network interface 34, which is used to communicate over the local area network 12.

As shown in FIG. 1, the personal computer 10 is also connected to the remote computer 11 by a modem 35, which is used to communicate over the wide area network 13, such as the Internet. The modem 35 is connected to the system bus 18 via the serial port interface 30. The modem 35 also can be connected to the public switched telephone network (PSTN) or community antenna television (CATV) network. Although illustrated in FIG. 1 as external to the personal computer 10, those of ordinary skill in the art can recognize that the modem 35 may also be internal to the personal computer 11, thus communicating directly via the system bus 18. It is important to note that connection to the remote computer 11 via both the local area network 12 and the wide area network 13 is not required, but merely illustrates alternative methods of providing a communication path between the personal computer 10 and the remote computer 11.

Although other internal components of the personal computer 10 are not shown, those of ordinary skill in the art will appreciate that such components and the interconnection between them are well known. Accordingly, additional details concerning the internal construction of the personal computer 10 need not be disclosed in connection with the present invention.

Those skilled in the art will understand that program modules such as an operating system 36, project software module 37, other software modules 38, and data are provided to the personal computer 10 via computer-readable media. In the preferred computer, the computer-readable media include the local or remote memory storage devices, which may include the local hard disk drive 20, floppy disk 23, CD-ROM or DVD 26, RAM 17, ROM 16, and the remote memory storage device 33. In the preferred personal computer 10, the local hard disk drive 20 is used to store data and programs, including the operating system and programs.

Figure 2:
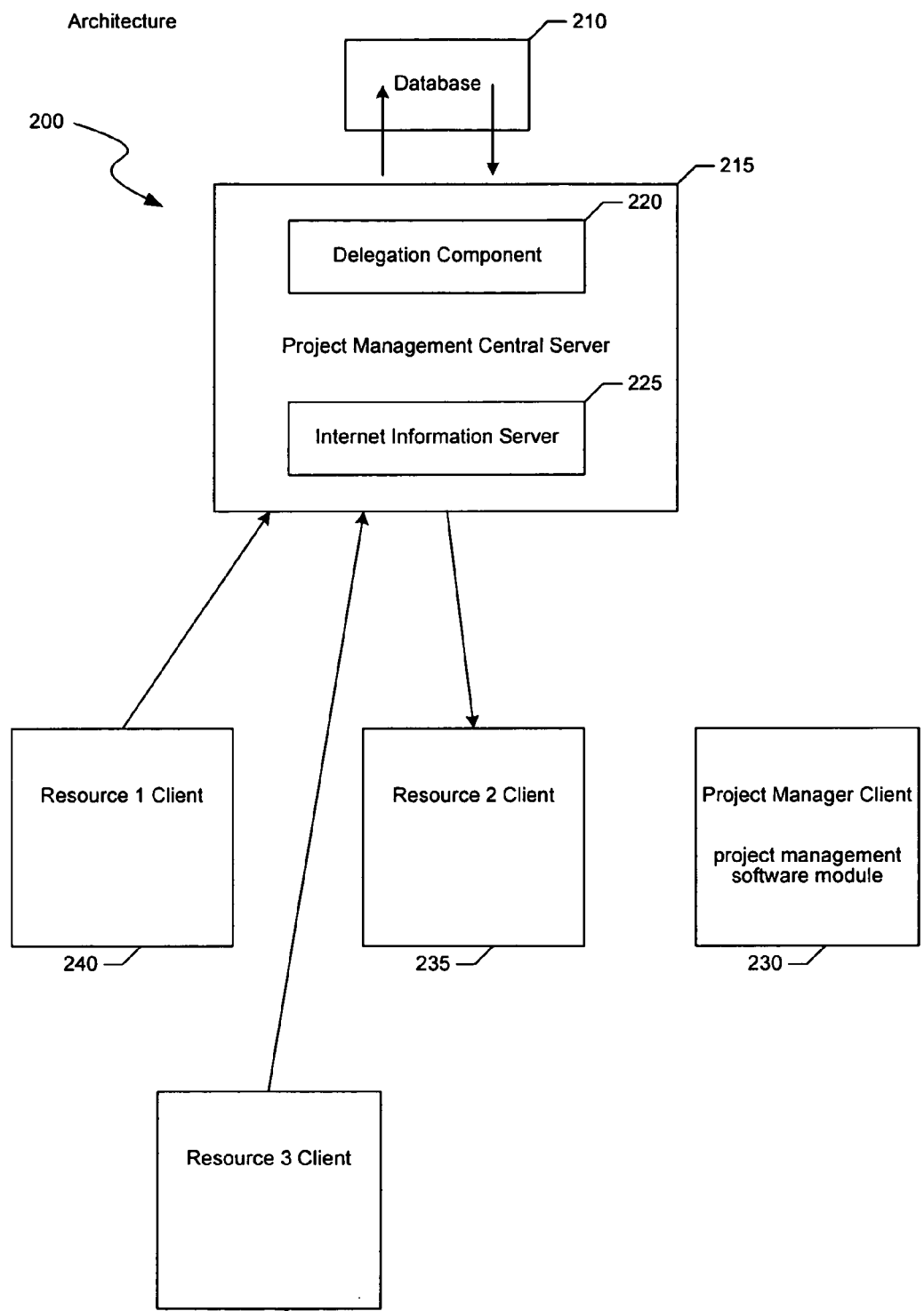
FIG. 2 is a functional block diagram illustrating the architecture of a distributed computer network in accordance with an exemplary embodiment of the present invention.

Referring now to FIG. 2, an exemplary architecture of the present invention will be described. FIG. 2 illustrates an exemplary system 200 for delegating tasks in a project management context. The system 200 includes a project management central server 215 that directs signals sent to and from the components of the distributed computing environment. The project management central server 215 may further comprise an Internet information server 225 that translates messages sent as an Active Server Page (ASP) to HyperText Markup Language (HTML). The project management central server 215 may also contain a delegation component 220 which sends and retrieves information about project tasks stored in a database 210. The Internet information server 225 transmits messages to clients. Clients typically comprise a project manager client 230, from which the project is supervised, and resource clients 235, 240, and 245, where work is done on particular tasks.

Horizontal delegation of a task, from peer to peer, can be initiated by the resource 1 client 240. A delegation signal is sent from the resource 1 client 240 to the Internet information server 225, where it is processed and forwarded to the project management central server 215. The delegation information is sent to the delegation component 220 which stores the information in the database 210. When the delegatee, which in this example is the resource 2 client 235, and the project manager client 230 access the project management central server 215, they can receive the delegation information. Vertical delegation of a task is accomplished in a similar manner, but involves delegation between a lead resource (the delegator) and a subordinate resource (delegatee).

Figure 3A:
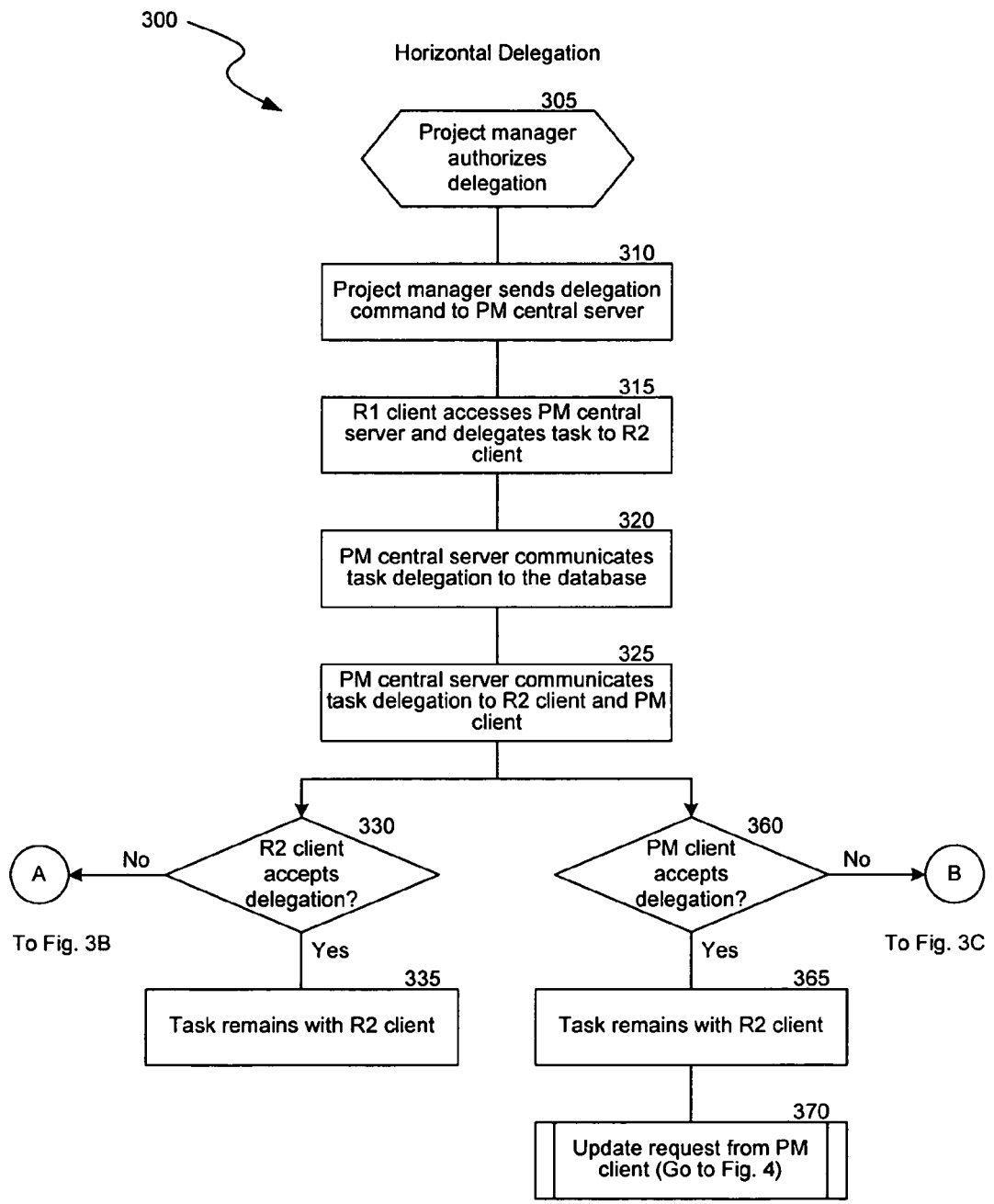
FIG. 3A is a logic flow diagram illustrating an exemplary process for horizontal delegation.
Figure 3B:
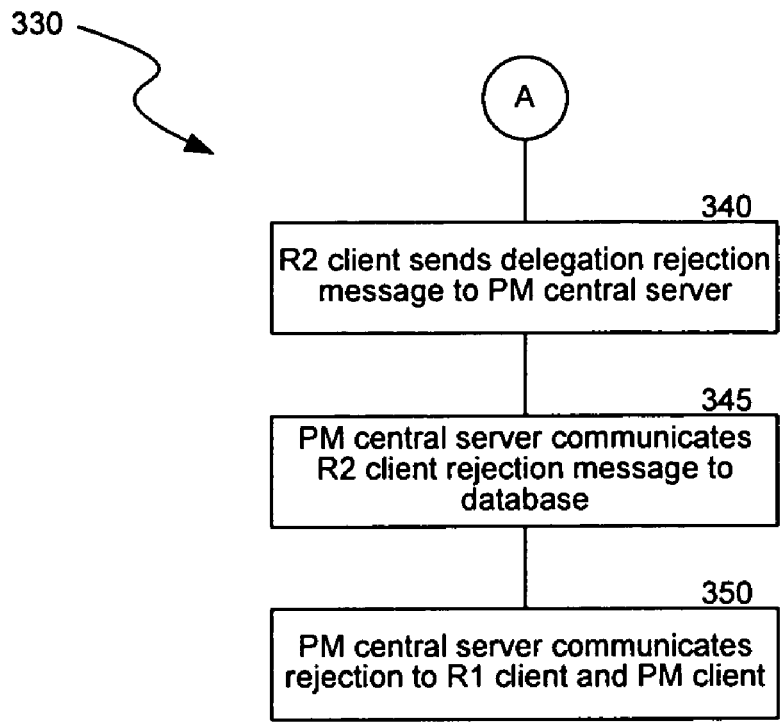
FIG. 3B is a logic flow diagram illustrating a detailed exemplary process concerning resource client acceptance of a delegation.
Figure 3C:
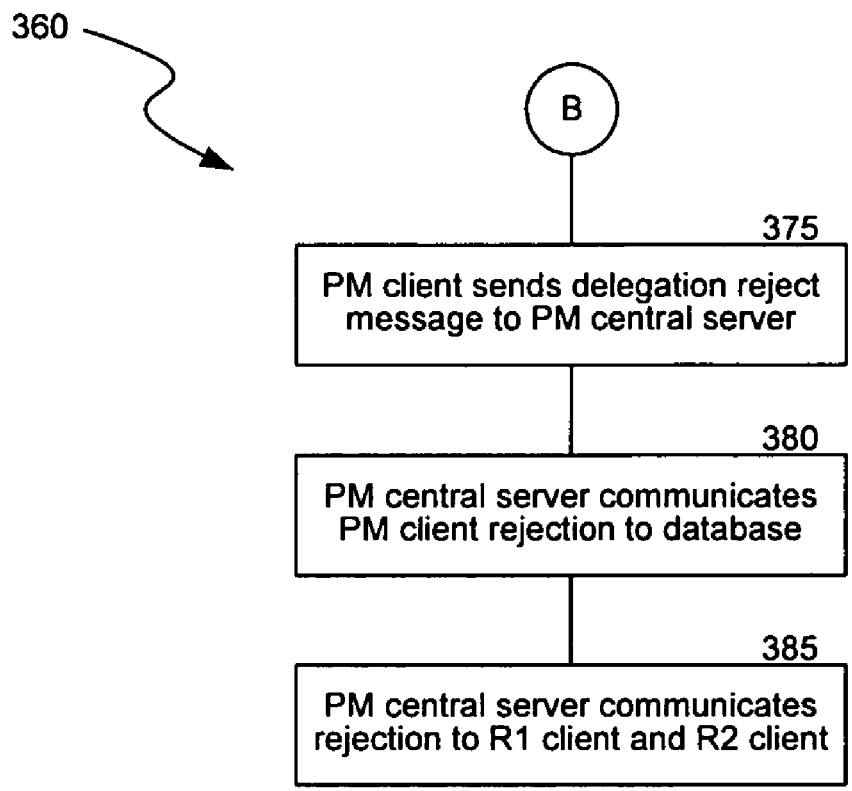
FIG. 3C is a logic flow diagram illustrating a detailed exemplary process concerning project manager client approval of a delegation.

FIGS. 3A, 3B, and 3C are logic flow diagrams illustrating exemplary steps for horizontal delegation of a task from resource 1 client 240 to resource 2 client 235. A process 300 begins at step 305 with the project manager client 230 authorizing the delegation of tasks among resource clients. In step 310, the project manager client 230 sends a delegation authorization command to the project management central server 215 via a computer network. The delegation authorization command is processed by the Internet information server 225 and sent to the project management central server 215. The project management central server 215 communicates the delegation authorization command to the delegation component 220. In step 315, the resource 1 client 240 can then initiate a delegation of a task to the resource 2 client 235. The delegation message is sent from the resource 1 client 240 to the Internet information server 225, which forwards it to the project management central server 215. In step 320, the project management central server 215 sends the delegation message to the delegation component 220 and the new task ownership information is forwarded to the database 210. In step 325, the Internet information server 225 communicates the delegation information to the resource 2 client 235 and the project manager client 230.

In step 330, the resource 2 client 235 decides whether to accept or reject the delegation of the task. If the resource 2 client 235 accepts the task, then the "yes" branch is followed to step 335 and the task remains with the resource 2 client 235. If the response at step 330 is negative, then the "no" branch is followed to step 340. In step 340, the resource 2 client 235 sends the delegation rejection message to the Internet information server 225, which processes the message and forwards it to the project management central server 215. In step 345 the delegation rejection message is sent to the delegation component 220 and the new task ownership data is sent to the database 210. In step 350 the Internet information server 225 communicates the delegation rejection to the resource 1 client 240 and to the project manager client 230.

In step 360, the project manager client 230 decides whether to approve or reject the delegation of the task. If the response at step 360 is negative, the "no" branch is followed to step 375, where the project manager client 230 sends a delegation rejection message to the Internet information server 225. The Internet information server 225 processes the message and forwards it to the project management central server 215. In step 380, the project management central server 215 forwards the delegation rejection message to the delegation component 220, which sends the new task ownership information to the database 210. In step 385, the Internet information server 225 communicates the delegation rejection to the resource 1 client 240 and the resource 2 client 235.

If the response at step 360 is affirmative, the "yes" branch is followed to step 365 and the task remains with the resource 2 client 235. In step 370, the project manager client 230 may request an update for all of the project data.

FIG. 3 illustrates a horizontal delegation of a task from the resource 1 client 240 to the resource 2 client 235 which is communicated over the distributed computing environment. If the resource 2 client 235 or the project manager client 230 should reject the delegation, this would be communicated over the distributed computing environment and ownership for the task would return to the resource 1 client 240. The database 210 maintains a record of all delegations and the ownership of all tasks.

Figure 4:
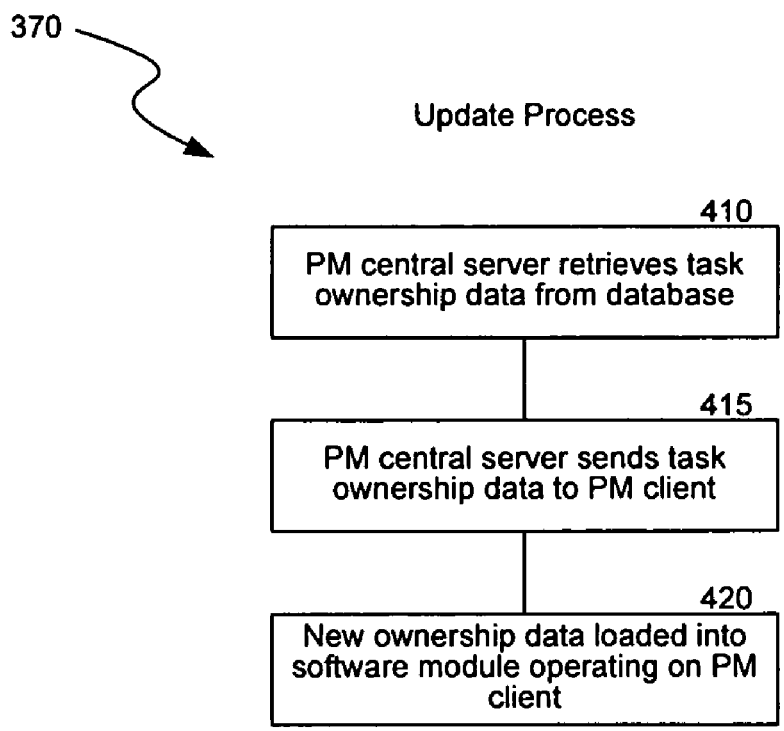
FIG. 4 is a logic flow diagram illustrating a detailed exemplary process of the update function.

FIG. 4 is a logic flow diagram illustrating an update process for providing the project manager client 230 with the most current information on all tasks in a project. In step 370 (FIG. 3C), the project manager client 230 sends the update request to the Internet information server 225, where the request is processed and sent to the project management central server 215. The functions completed in step 370 are described below in connection with FIG. 4. At step 410, the project management central server 215 communicates with the delegation component 220, which retrieves the task data information from the database 210. At step 415, the task data information is converted into a format that can ultimately be read by the software module operating on the project manager client 230. This converted data is sent by the Internet information server 225 to the project manager client 230. At step 420, the new task data is loaded into the software module operating on the project manager client 230.

The update process provides the project manager client 230 with access to the most current information about the progress of the project. With this information the project manager client 230 can find out, among other things, what resource client is working on a particular task and what the status of the task is.

Figure 5:
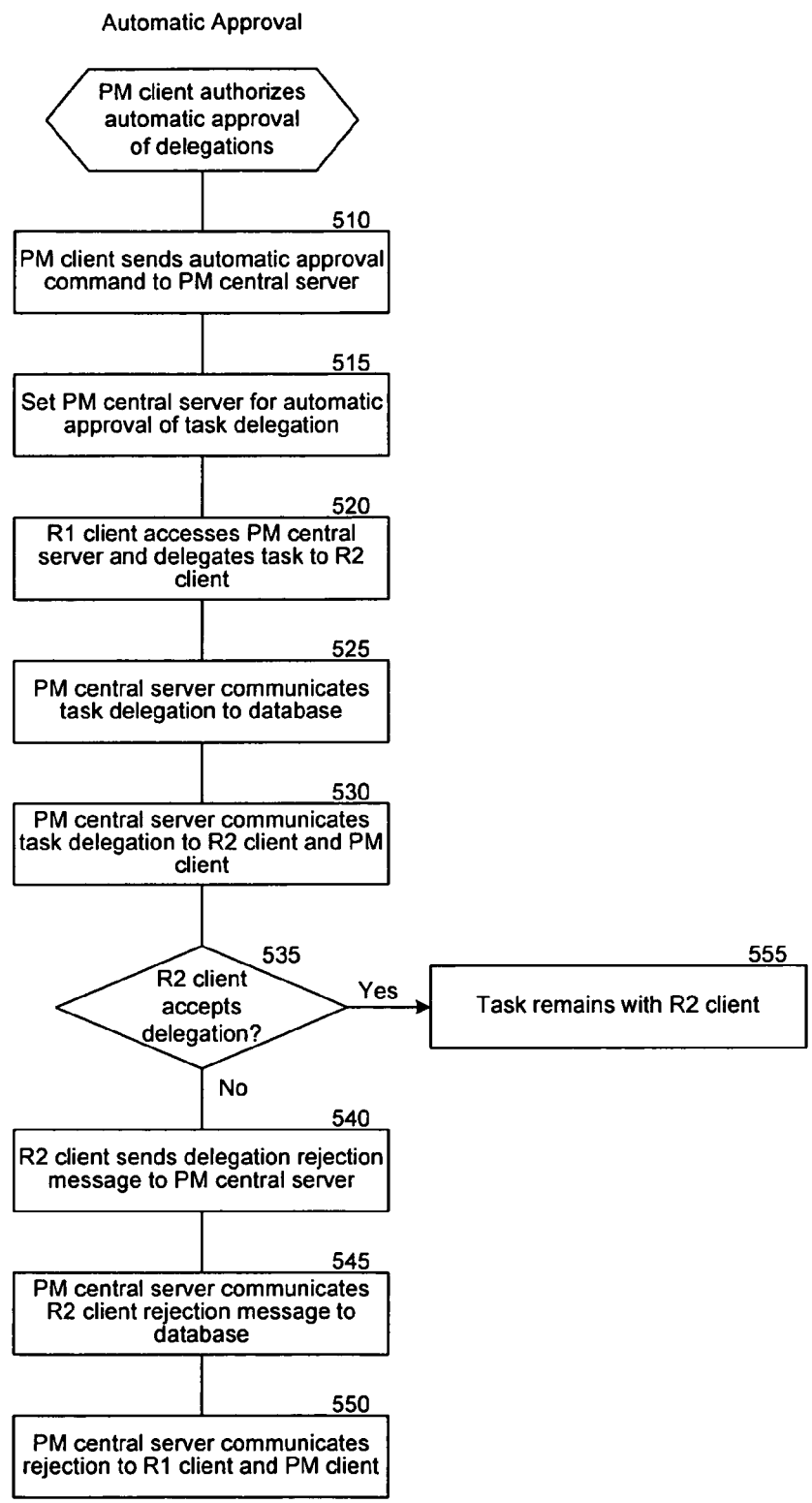
FIG. 5 is a logic flow diagram illustrating an exemplary process for automatic approval of a delegation.

FIG. 5 is a logic flow diagram showing the process by which a project manager client can authorize automatic approval of delegations, leaving acceptance of a delegation solely up to the resource client receiving the delegated task. In step 510, the project manager client 230 sends the automatic approval command to the Internet information server 225, which processes the command and sends it to the project management central server 215. In step 515, the project management central server 215 is set for automatic approval of task delegation. In step 520, the resource 1 client 240 sends a delegation message to the Internet information server 225, where it is processed and sent to the project management central server 215. In step 525, the project management central server 215 sends the delegation message to the delegation component 220, which, in turn, sends the delegation information to the database 210. In step 530, the Internet information server 225 communicates the task delegation to the resource 2 client 235 and to the project manager client 230.

At step 535 the resource 2 client 235 decides whether to accept the delegation of the task. If the resource 2 client 235 chooses to accept the delegation, the "yes" branch is followed to step 555 and the task remains with the resource 2 client 235. If the resource 2 client 235 declines the delegation, the "no" branch is followed to step 540 and a delegation rejection message is sent to the Internet information server 225. The Internet information server 225 processes the delegation rejection message and forwards it to the project management central server 215. At step 545, the project management central server 215 communicates the delegation rejection to the delegation component 220 and the information is sent to the database 210. The Internet information server 225 communicates the rejection to the resource 1 client 240 and to the project manager client 230.

Figure 6A:
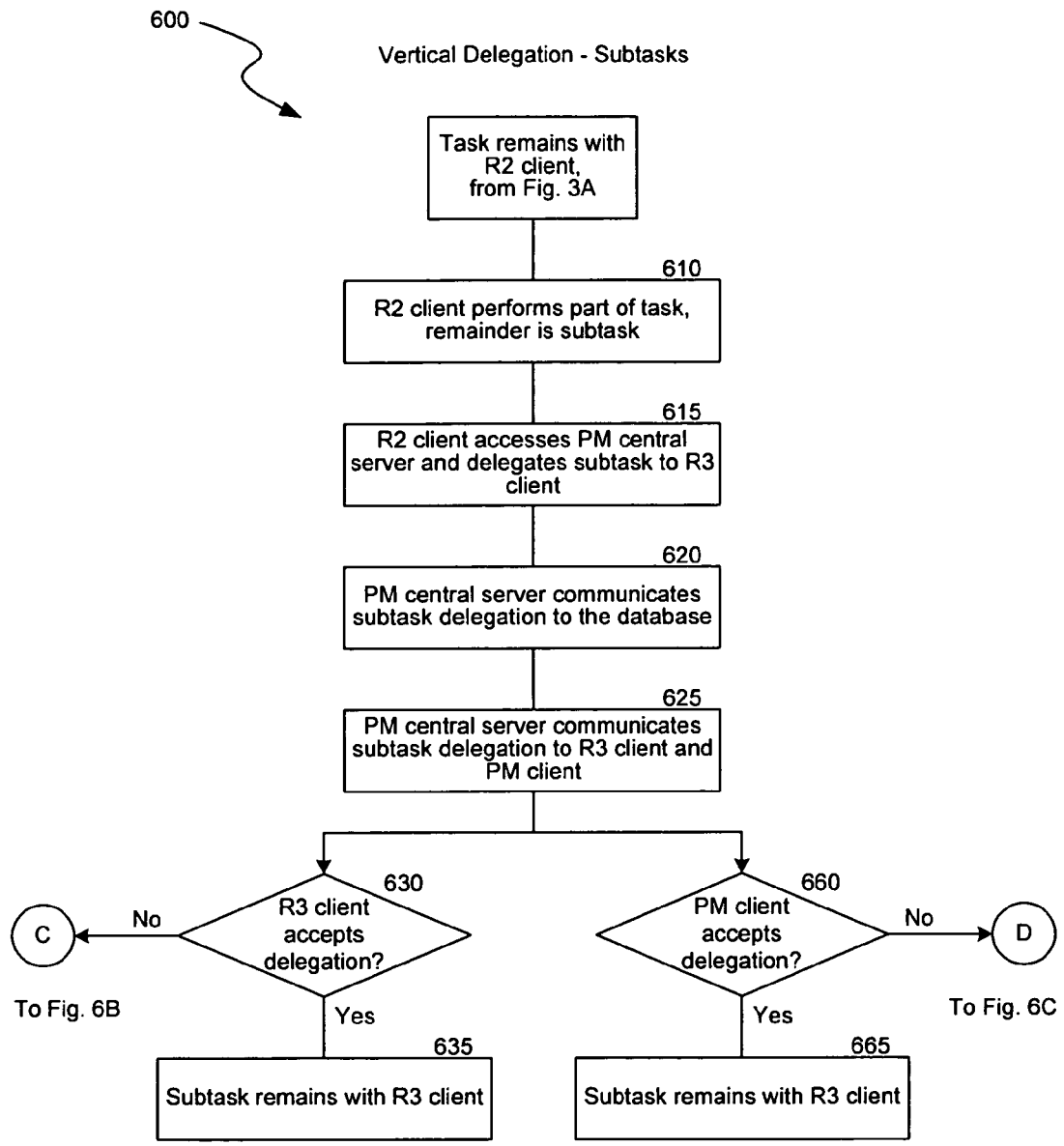
FIG. 6A is a logic flow diagram illustrating an exemplary process for vertical delegation.
Figure 6B:
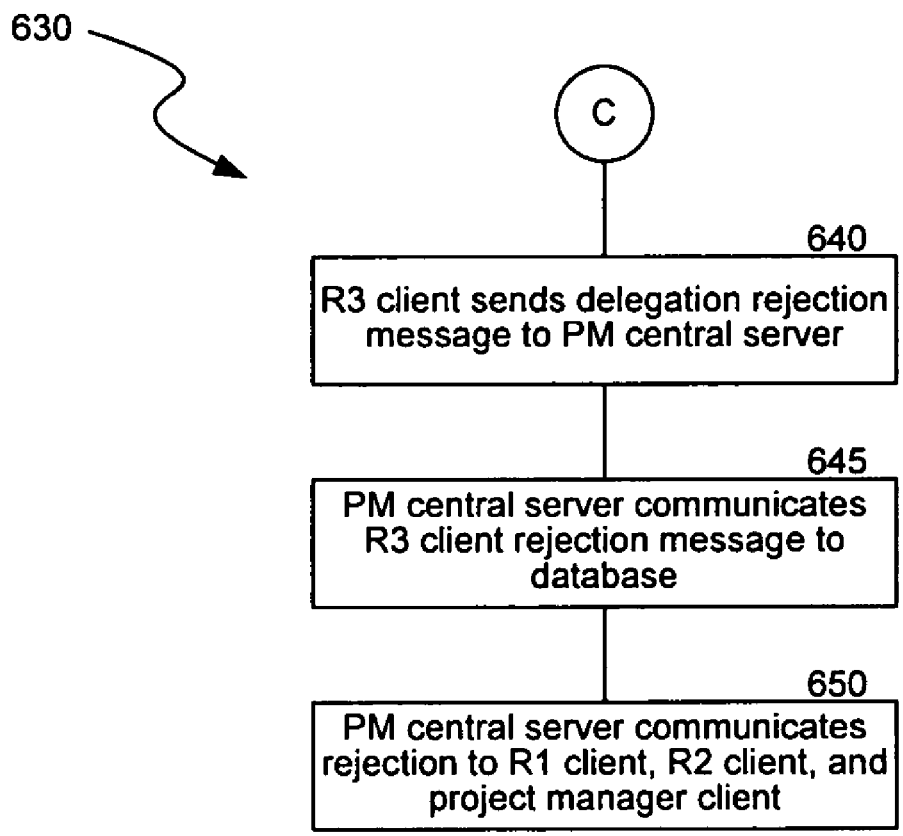
FIG. 6B is a logic flow diagram illustrating a detailed exemplary process concerning resource client acceptance of a delegation.
Figure 6C:
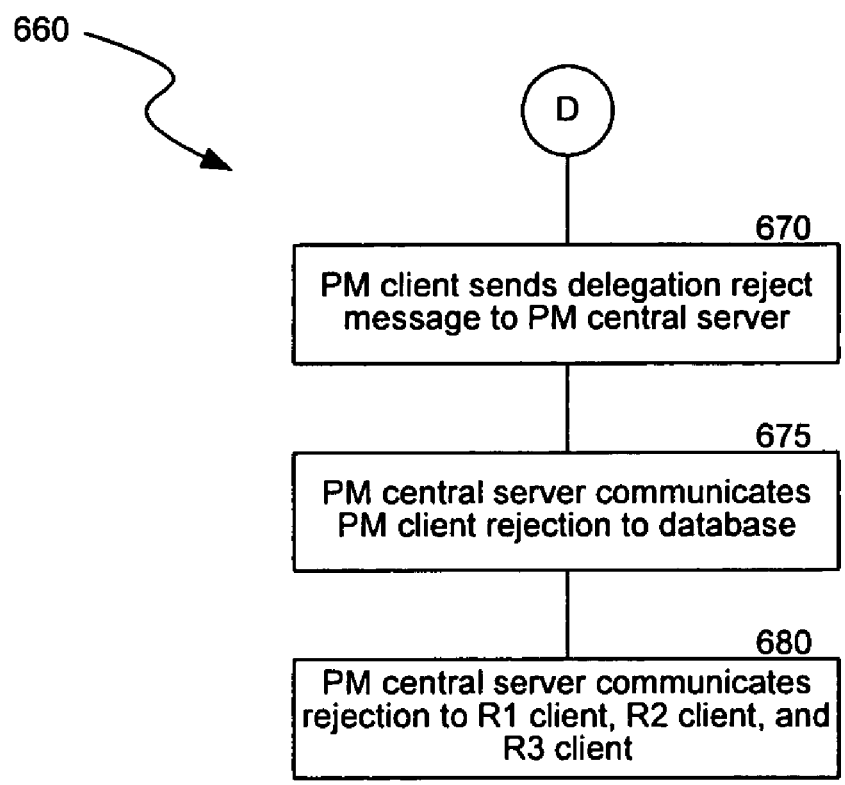
FIG. 6C is a logic flow diagram illustrating a detailed exemplary process concerning project manager client approval of a delegation.

FIGS. 6A, 6B, and 6C are logic flow diagrams illustrating an exemplary process for vertical delegation of a subtask from a lead resource to a subordinate resource. In an alternative embodiment, the process can be for vertical delegation of a whole task from a lead resource to a subordinate resource. In this representative example, the vertical delegation process assumes a task has been delegated to the resource 2 client 235 by resource 1 client 240. In step 610, resource 2 client 235 performs part of the task and the remainder becomes a subtask. In step 615, resource 2 client 235 then initiates delegation of the subtask to resource 3 client 245 by sending a delegation message to the Internet information server 235. The Internet information server 235 processes the message and forwards it to the project management central server 215, which in turn forwards it to the delegation component 220. In step 620, the delegation component 220 sends the delegation information to the database 210. In step 625, the Internet information server 225 communicates the subtask delegation to the resource 3 client 245 and to the project manager client 230.

In step 630, the resource 3 client 245 decides whether to accept the delegation. If there is an affirmative response, the "yes" branch leads to step 635 where the subtask remains with the resource 3 client 245. If the response is negative, the "no" branch leads to step 640 where the resource 3 client 245 sends a subtask delegation rejection message to the Internet information server 225. The Internet information server 225 processes the rejection message and forwards it to the project management central server 215, which forwards the information to the delegation component 220. In step 645 the delegation component 220 sends the rejection information to the database 210. In step 650, the Internet information server communicates the subtask delegation rejection to the resource 1 client 240, the resource 2 client 235, and the project manager client 230.

In step 660, the project manager client 230 decides whether to approve or reject the subtask delegation. If approved, the "yes" branch is followed to step 665 where the subtask remains with the resource 3 client 245. If rejected, the "no" branch is followed to step 670 where the project manager client 230 sends a subtask delegation rejection message to the Internet information server 225. The Internet information server 225 processes the rejection message and forwards it to the project management central server 215, which forwards the information to the delegation component 220. In step 675 the delegation component communicates the rejection information to the database 210. In step 680, the Internet information server 225 communicates the rejection to the resource 1 client 240, resource 2 client 235, and resource 3 client 245.

Figure 7:
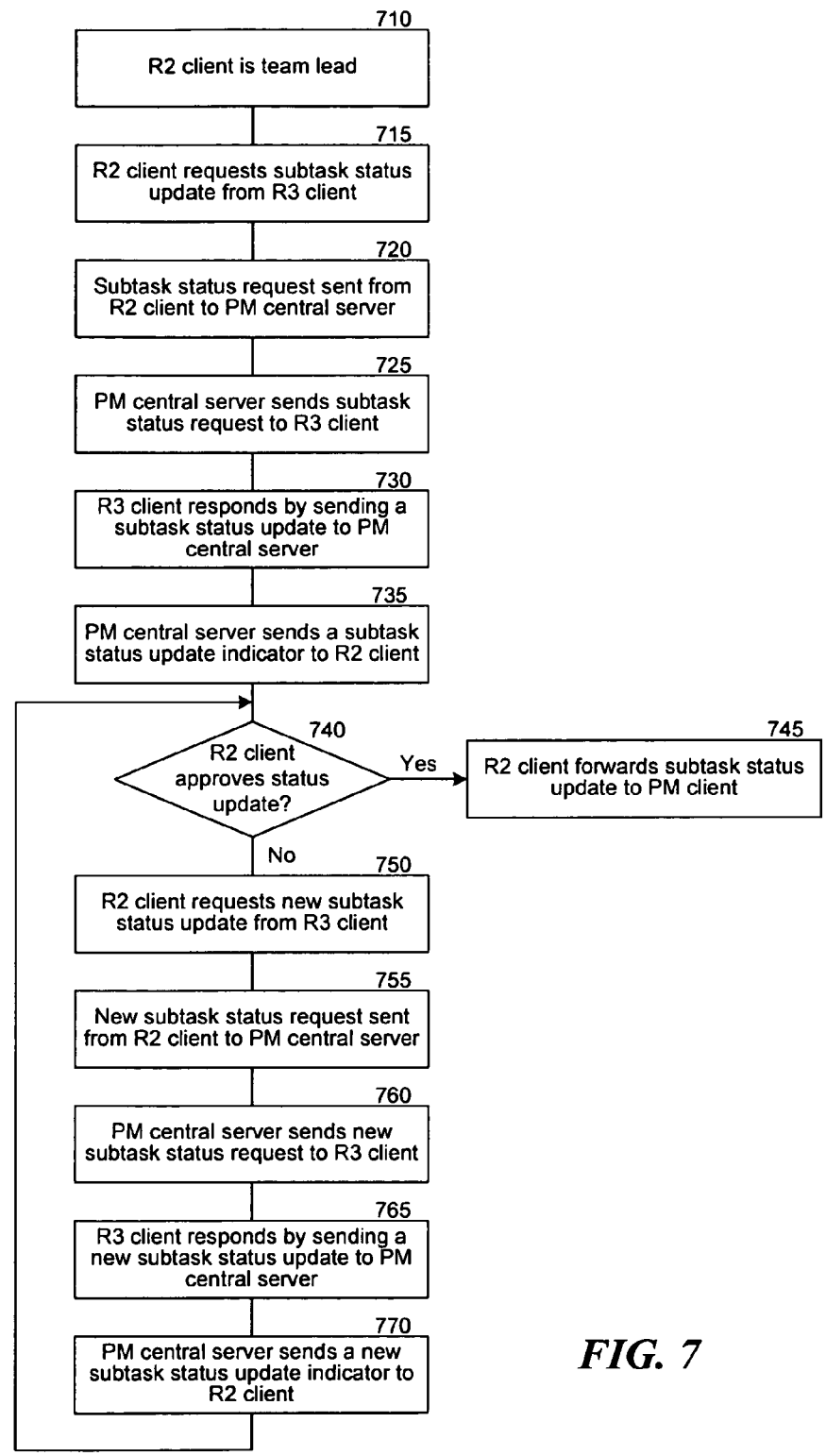
FIG. 7 is a logic flow diagram illustrating an exemplary process for vertical delegation with a team lead.

FIG. 7 is a logic flow diagram for a process whereby a lead resource client requests an update from a subordinate resource client in a vertical delegation context. The process begins at step 710 with the resource 2 client 235 choosing to become a team lead. In step 715, the resource 2 client 235 requests a subtask status update from the resource 3 client 245. This is initiated in step 720 where the resource 2 client 235 sends a request for a subtask status update to the project management central server 215. At step 725, the project management central server 215 forwards the subtask status update request to the resource 3 client 245. In step 730, the resource 3 client 245 responds by sending a subtask status update to the project management central server 215, which in turn, forwards the response to the resource 2 client 235 in step 735.

At step 740, the resource 2 client 235 decides whether to approve or reject the subtask status update. If the decision is approval, the "yes" branch is followed to step 745 and the resource 2 client 235 forwards the subtask status update to the project manager client 230. If the decision is rejection, the "no" branch is followed to step 750 where the resource 2 client 235 requests a new subtask status update from the resource 3 client 245. In step 755, the new subtask status request is sent from the resource 2 client 235 to the project management central server 215. The project management central server 215 forwards the new subtask status request to the resource 3 client 245 in step 760 and the resource 3 client 245 responds by sending a new subtask status update to the project management central server 215 in step 765. At step 770, the project management central server 215 forwards the new subtask status update to the resource 2 client 235 where approval or rejection must again be decided at step 740.

FIG. 8 illustrates a representative example of database structures. Each task within the project can be given a task name 820 and a task identification number 815, which will facilitate tracking and monitoring the task as it is delegated and completed. Management of the project is further aided with identifying numbers assigned to each resource and to each delegation event. An assignment table 810 sets forth the task identification number 815, the task name 820, the identification number of the resource client to which the task is assigned 825, and the identification number of the team lead resource client 830, if there is one. A delegation table 835 may contain an identification number for each delegation of a task that occurs 840, a resource 1 client identification number 845, a resource 2 client identification number 850, the date 855 of the delegation, and an indicator of whether the delegation was rejected 860. A delegation-task table 865 can correlate delegation identification numbers 840 with task identification numbers 815. A delegation-task table 865 can also set forth whether the project manager client approved the delegation 870, whether the resource client accepted the delegation 875, and whether either wants to retain a copy of the task to track its progress 880. A message table 885 can contain delegation identification numbers 840 and any corresponding message 890 about the delegation.

In summary, the present invention enables and supports the delegation of tasks and collaboration among resources in a project management context. The invention allows a project manager to control the delegation of tasks or to leave delegation decisions to resources. The invention also allows resources to further define, subdivide, and delegate tasks. Information about each task and each delegation is recorded for the project manager.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention as set forth in the appended claims and equivalence thereof.

What is claimed is:

1. A method in a task delegation system for delegating a task through a server, the method comprising:
   receiving from a project manager client an indication to delegate a task to a first resource client;
   upon receiving from the project manager client the indication to delegate the task to the first resource client,
      recording in a storage medium the delegation of the task from the project manager client to the first resource client; and
      sending the first resource client an indication of the delegation of the task to the first resource client;
   receiving from the first resource client a request to delegate the task to a second resource client; and
   upon receiving the request from the first resource client to delegate the task to the second resource client,
      recording in the storage medium the request from the first resource client to delegate the task to the second resource client;
      sending the second resource client an indication of the request from the first resource client to delegate the task to the second resource client; and
      sending the project manager client an indication of the request from the first resource client to delegate the task to the second resource client wherein the project manager client has various levels of control over the task delegation.

2. The method of claim 1, wherein the indication sent to the second resource client is a request to accept or refuse the task delegation requested by the first resource client.

3. The method of claim 1 further comprising:
   receiving from the second resource client a rejection of the delegation request from the first resource client to the second resource client; and
   upon receiving from the second resource client the rejection of the delegation request,
      recording in the storage medium the rejection, by the second resource client, of the delegation request from the first resource client to the second resource client;
      sending the first resource client an indication of the rejection, by the second resource client, of the delegation request from the first resource client to the second resource client; and
      sending the project manager client an indication of the rejection, by the second resource client, of the delegation request from the first resource client to the second resource client.

4. The method of claim 1 further comprising:
   receiving from the second resource client an acceptance of the delegation request from the first resource client to the second resource client; and
   upon receiving from the second resource client the acceptance of the delegation request,
      recording in the storage medium the acceptance, by the second resource client, of the delegation request from the first resource client to the second resource client;
      sending the first resource client an indication of the acceptance, by the second resource client, of the delegation request from the first resource client to the second resource client; and
      sending the project manager client an indication of the acceptance, by the second resource client, of the delegation request from the first resource client to the second resource client.

5. The method of claim 1 further comprising:
   receiving from the project manager client a rejection of the delegation request from the first resource client to the second resource client; and
   upon receiving from the project manager client the rejection of the delegation request,
      recording in the storage medium the rejection, by the project manager client, of the delegation request from the first resource client to the second resource client;
      sending the first resource client an indication of the rejection, by the project manager client, of the delegation request from the first resource client to the second resource client; and sending the second resource client an indication of the rejection, by the project manager client, of the delegation request from the first resource client to the second resource client.

6. The method of claim 1 further comprising receiving from the project manager client an approval of the delegation request from the first resource client to the second resource client.

7. The method of claim 1 further comprising receiving from the project manager client an authorization for the first resource client to delegate the task to another resource client.

8. A computer-readable storage medium whose contents cause a computer to:
   receive from a first resource client a request to delegate a task to a second resource client, wherein the task was previously delegated to the first resource client by a project manager client; and
   responsive to the request from the first resource client to delegate the task to the second resource client,
      send the second resource client an indication of the request from the first resource client to delegate the task to the second resource client;
      send the project manager client an indication of the request from the first resource client to delegate the task to the second resource client and record the requests in a recording medium, wherein the project manager client has various levels of control over the task delegation.

9. The computer-readable storage medium of claim 8 further comprising contents that cause the computer to, responsive to the request from the first resource client to delegate the task to the second resource client, record in a storage medium the request from the first resource client to delegate the task to the second resource client.

10. The computer-readable storage medium of claim 8, wherein the indication sent to the second resource client is a request to accept or refuse the task delegation requested by the first resource client.

11. The computer-readable storage medium of claim 8 further comprising contents that cause the computer to:
   receive from the second resource client a rejection of the delegation request from the first resource client to the second resource client; and
   responsive to the rejection by the second resource client of the delegation request,
      send the first resource client an indication of the rejection, by the second resource client, of the delegation request from the first resource client to the second resource client; and
      send the project manager client an indication of the rejection, by the second resource client, of the delegation request from the first resource client to the second resource client.

12. The computer-readable storage medium of claim 11 further comprising contents that cause the computer to, responsive to the rejection by the second resource client of the delegation request, record in a storage medium the rejection, by the second resource client, of the delegation request from the first resource client to the second resource client.

13. The computer-readable storage medium of claim 8 further comprising contents that cause the computer to:
   receive from the second resource client an acceptance of the delegation request from the first resource client to the second resource client; and
   responsive to the acceptance by the second resource client of the delegation request,
      send the first resource client an indication of the acceptance, by the second resource client, of the delegation request from the first resource client to the second resource client; and
      send the project manager client an indication of the acceptance, by the second resource client, of the delegation request from the first resource client to the second resource client.

14. The computer-readable storage medium of claim 13 further comprising contents that cause the computer to, responsive to the acceptance by the second resource client of the delegation request, record in a storage medium the acceptance, by the second resource client, of the delegation request from the first resource client to the second resource client.

15. The computer-readable storage medium of claim 8 further comprising contents that cause the computer to:
   receive from the project manager client a rejection of the delegation request from the first resource client to the second resource client; and
   responsive to the rejection by the project manager client of the delegation request,
      send the first resource client an indication of the rejection, by the project manager client, of the delegation request from the first resource client to the second resource client; and
      send the second resource client an indication of the rejection, by the project manager client, of the delegation request from the first resource client to the second resource client.

16. The computer-readable storage medium of claim 15 further comprising contents that cause the computer to, responsive to the rejection by the project manager client of the delegation request, record in a storage medium the rejection, by the project manager client, of the delegation request from the first resource client to the second resource client.

17. The computer-readable storage medium of claim 8 further comprising contents that cause the computer to receive from the project manager client an approval of the delegation request from the first resource client to the second resource client.

18. The computer-readable storage medium of claim 8 further comprising contents that cause the computer to receive from the project manager client an authorization for the first resource client to delegate the task to another resource client.

19. A task delegation system having a server for recording and communicating task delegation requests comprising:
   a means for receiving from a first resource client a request to delegate a task to a second resource client, wherein the task was previously delegated to the first resource client by a project manager client; and
   responsive to the request from the first resource client to delegate the task to the second resource client,
      a means for sending the second resource client an indication of the request from the first resource client to delegate the task to the second resource client; and
      a means for sending the project manager client an indication of the request from the first resource client to delegate the task to the second resource client wherein the project manager client has various levels of control over the task delegation.

* * * * *